Feb. 16, 1943. W. N. ALLYN ET AL 2,311,503
OPHTHALMOSCOPE
Filed Jan. 21, 1941 2 Sheets-Sheet 1

Inventors
W. N. Allyn
W. G. Allyn
By Robb & Robb
Attorneys.

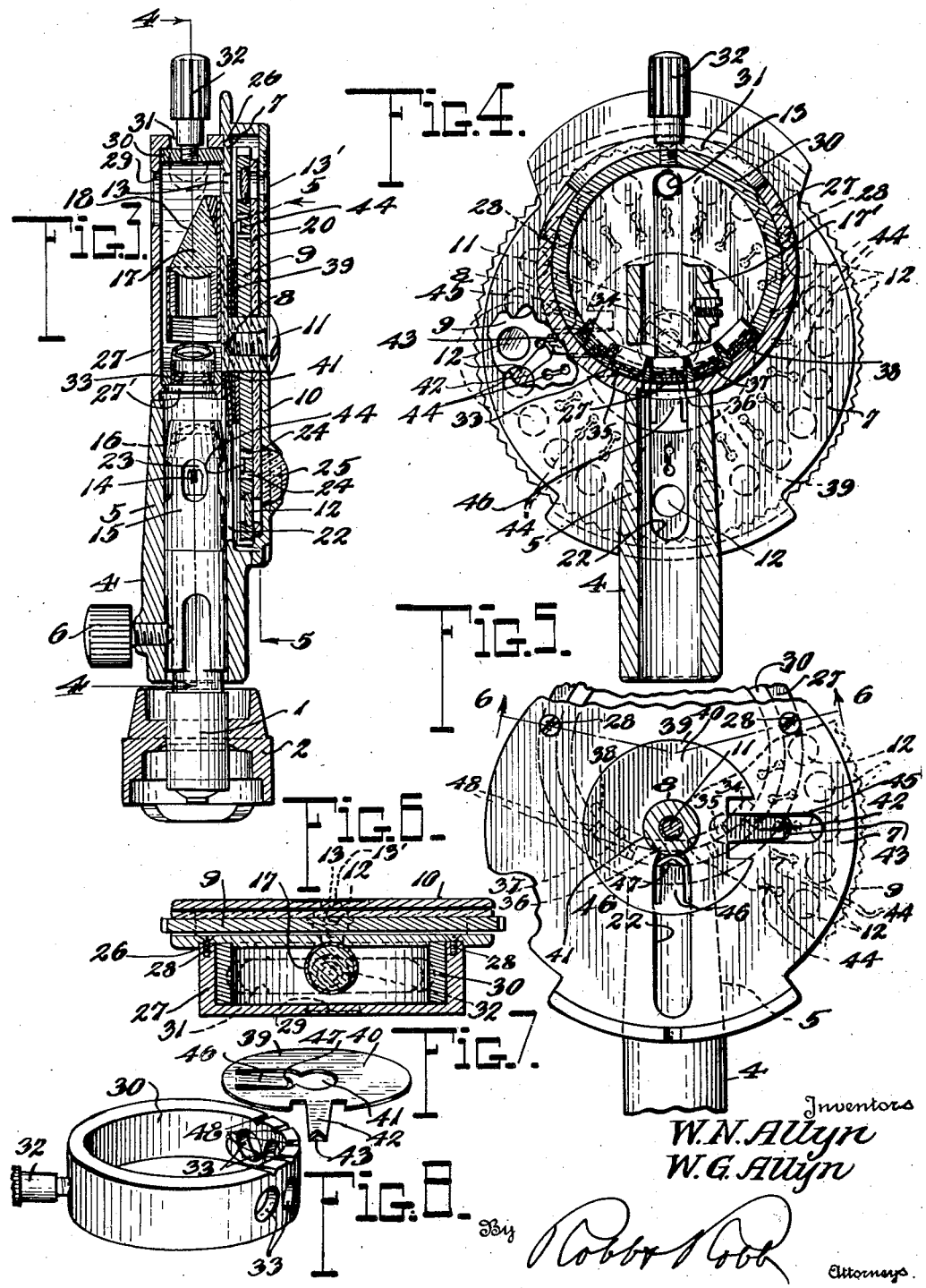

Patented Feb. 16, 1943

2,311,503

UNITED STATES PATENT OFFICE 2,311,503

OPHTHALMOSCOPE

William N. Allyn and William G. Allyn,
Skaneateles, N. Y.

Application January 21, 1941, Serial No. 375,344

9 Claims. (Cl. 88—22)

This invention relates to instruments for use in the examination of the eye, and more especially to ophthalmoscopes, retinoscopes, and the like embodying an adjustable lens carrier which is provided with a plurality of lenses of different dioptrics for selective registration with a sight opening in the supporting frame of the lens carrier. In these instruments there is also usually provided an illuminating system which serves to project a small beam of light into the eye which is under examination by the user of the instrument. The light rays are derived from a small but powerful electric lamp having associated therewith suitable means for directing the light rays into the eye to illuminate a predetermined area of the eye which can be viewed through the sight opening of the instrument.

It is sometimes desirable in instruments of this character to employ various light modifying instrumentalities which may be selectively brought into play to confine, enlarge, or otherwise control in a predetermined manner the light rays before they are directed into the eye. A typical instrument of this character is disclosed in the prior Patent No. 1,981,214, granted November 20, 1934, to W. N. Allyn. As disclosed in that patent the light modifying instrumentalities have the form of a slidably adjustable diaphragm which is provided with a series of apertures of various types which are arranged to be selectively interposed between the source of light and the eye to modify the light as may be desired to facilitate complete and accurate examination of the eye.

The present invention has been developed as an improvement over the prior construction above referred to, said improvement residing primarily in the use of a much simpler form of diaphragm which is not only capable of selectively controlling the size and/or shape of the light beam, but which is also capable of selectively filtering, diffusing, and/or otherwise modifying the light as will hereinafter be more fully described.

A further object of the invention is to provide a combination diaphragm and auxiliary lens carrier for instruments of the aforementioned character and which may be applied thereto without material change from their conventional design, while at the same time affording greater ease of assembly and disassembly as compared with the prior slide type diaphragms, and which assures accuracy of alignment, smoothness of operation and easier adjustment.

A still further object of the invention is to provide an improved light modifying device having the advantages generally referred to in the preceding paragraph, and which also preserves the compactness of form of the entire instrument as disclosed in the patent hereinabove referred to, and which is especially applicable to the prism type illuminating system generally known in the trade as the May system.

Another object of the invention is to provide a simplified illuminated ophthalmoscope head which includes a main rotary lens carrier and an auxiliary rotary light modifier, permitting easier machining of the parts of the instrument with the assurance of more perfect fit, together with common detent means for facilitating selective adjustment of the respective main lens carrier and auxiliary light modifier, and for restraining these parts against accidental movement while in their selected positions of adjustment.

Other objects and advantages will be hereinafter described and the novel features thereof defined in the appended claims.

In the drawings:

Figure 3 is a sectional view taken on the line 3—3 of Figure 1;

Figure 4 is a vertical sectional view taken on the line 4—4 of Figure 3;

Figure 5 is a fragmentary detail view of the ophthalmoscope head with the front cover plate of the frame and the main lens carrier removed, a portion of the main lens carrier being shown in broken lines;

Figure 6 is a sectional view taken on the line 6—6 of Figure 5;

Figure 7 is a perspective view of the detent means which is common to the main lens carrier and to the auxiliary light modifying instrumentalities; and Figure 8 is a perspective view of the rotary auxiliary carrier for the light modifying instrumentalities.

Figures 1, 2:
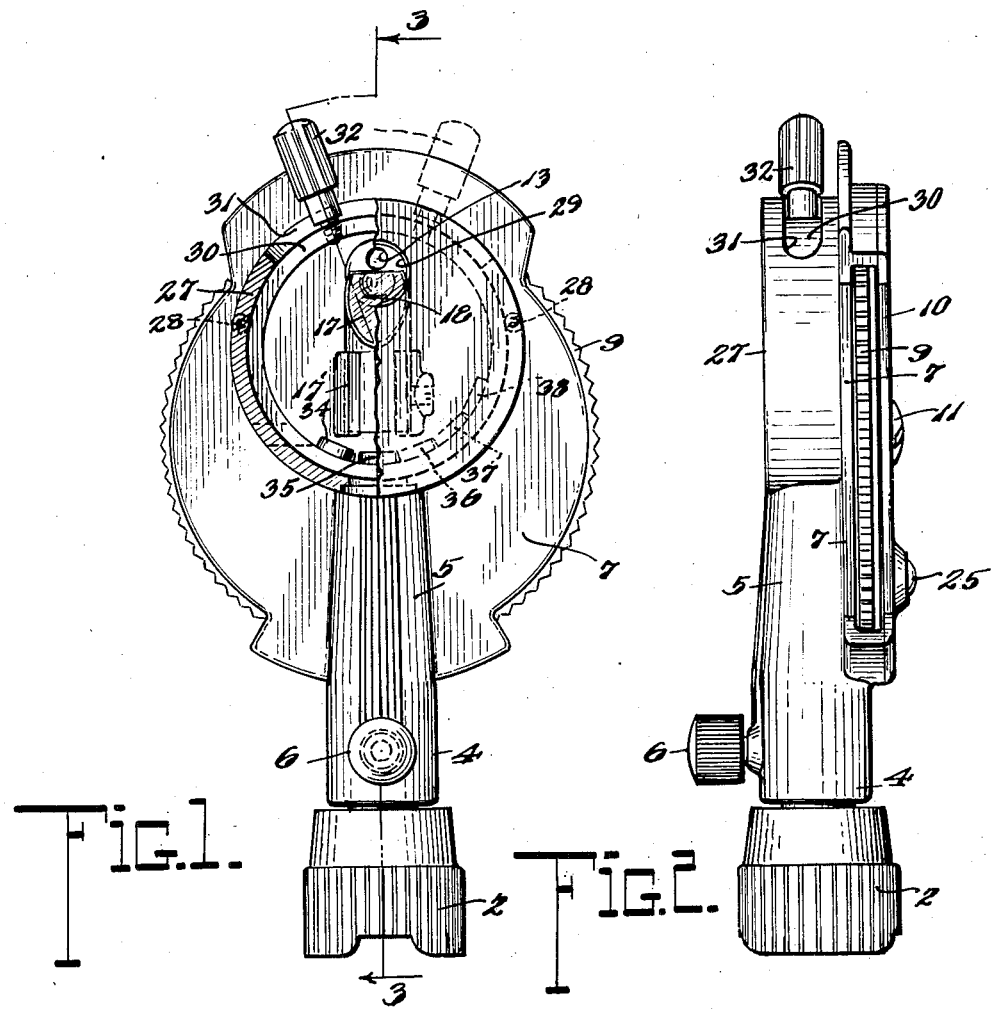
Figure 1 is a view in elevation, on a somewhat enlarged scale, of an ophthalmoscope head embodying our invention, as seen from the subject's side of the instrument, certain portions thereof being broken away and shown in section.
Figure 2 is a view of the ophthalmoscope head in side elevation.

Like reference characters designate corresponding parts in the several figures of the drawings wherein 1 denotes a lamp supporting spindle having a coupling 2 affixed to its lower end for attachment of the same to a battery handle 3

(not shown), or to some other suitable source of electrical current supply, the details of which are immaterial to this invention. Attached to the spindle 1 is a frame generally designated 4 which includes a cylindrical or tubular part 5 which receives the spindle 1 to which the frame is removably attached by means of the set screw 6. At the front or observer's side of the tubular part 5, is an upright stationary plate 7 having a central annular boss 8 on which is rotatably mounted a main lens carrier or disk 9. A front cover plate 10 is removably attached to the frame 4 by means of the screw 11 threadedly received in the boss 8 of the frame plate 7.

The main lens carrier 9 is free to rotate on the boss 8 between the plates 7 and 10, and carries adjacent to its periphery a plurality of equally spaced lenses 12 which are selectively registrable with a sight opening 13 in the plate 7 and a corresponding sight opening 13' in the cover plate 10, near the upper end of the frame 4. The sight openings 13, 13' are coaxial with each other so that as the main lens carrier 9 is rotated about its central axis, the various lenses 12 carried thereby, and which are of different dioptrics, are successively brought into register with these sight openings so that the observer may view the eye under examination through the sight openings and the interposed selected lens.

Carried by the spindle 1 and disposed within the tubular portion 5 of the ophthalmoscope frame is a small but powerful electric lamp 14 over which is positioned a ferrule 15 having mounted in its upper end a condenser lens 16. Disposed above the lamp 14 and adjustably mounted in a clamping frame 17' fixed to the back of the frame plate 7, is a prism 17 through which the light rays from the lamp 14 are projected. As the light rays pass through the prism, they are reflected by the reflecting surfaces and emerge from the rear face 18 of the prism in a direction generally parallel to and just below the axis of the sight openings 13, 13', so that as the observer looks through the sight openings into the eye of the subject under examination, the eye will be illuminated by the light rays in a well known manner.

To facilitate identification of the respective lenses 12 in the main lens carrier 9 as they are selectively brought into registration with the sight openings 13, 13' there is associated with each lens an index 19 (not shown) which may be borne by a translucent dial 20 fixed to the lens carrier 9 for rotation therewith so that the indices will be selectively registrable with an opening 21 in the cover plate 10. A portion of the light emitted by the lamp 14 is directed through the translucent index dial 20, thereby assuring plain visibility of the indices irrespective of the darkness and/or shadows occurring during the use of the ophthalmoscope. To this end, the plate 7 is slotted at 22, and the ferrule 15 is also provided with suitable openings 23 formed therein to permit some of the light from the lamp 14 to pass through the slot 22. The lens carrier 9 is provided with a pair of small radially spaced apertures 24 immediately behind each index on the translucent dial 20 so that the light passing through the opening 23 and slot 22 may pass through the lens carrier 9 and thereby illuminate the dial 20 as each index is brought into register with the opening 21 in the cover plate 10. To facilitate reading of the indices on the dial 20, a magnifying lens 25 is preferably mounted in the opening 21.

The construction of the ophthalmoscope head as just described more or less generally conforms to that disclosed in Patent No. 1,981,214 hereinabove referred to. It is to be understood, however, that the description is intended to be merely illustrative of one practical form of ophthalmoscope to which the present invention may be applied, and is not intended as limiting the invention to the precise details shown and described herein.

Referring now more particularly to Figures 4 to 8 inclusive, the back of the frame plate 7, that is, the side next to the subject under examination, is provided with an annular recess 26, in which there is seated the open end of a cup-shaped housing or casing 27 having a generally circular configuration. The housing 27 is preferably removably attached to the frame plate 7 in any suitable manner, as for example, by means of a pair of minute screws 28, 28 which extend from the front or observer's side through the frame plate 7 and into the rim of the housing 27. Near the upper extremity of the back wall of the housing 27, at the subject's side, an enlarged opening 29 is formed therein so that the observer's view through the openings 13, 13' in the ophthalmoscope frame will not be obstructed by the housing. Arranged within the housing and free to rotate therein is an annular ring or collar 30 which constitutes an auxiliary rotary carrier for the light modifying means now to be described. This auxiliary carrier 30 is preferably formed so that it has a smooth working bearing fit within the housing 27, and the forward end of the auxiliary carrier seats in the groove 26 in the back of the frame plate 7, along with the corresponding end of the housing 27, the groove 26 being wide enough for this purpose. The peripheral wall of the housing 27 at its upper side is provided with an elongated slot 31 through which extends an operating knob or arm 32 which is affixed at its inner end to the auxiliary carrier 30. By moving the knob 32 in one direction or the other in the elongated slot 31, a rotary movement will be imparted to the auxiliary carrier 30, causing the latter to turn on its central axis which is arranged horizontally and generally parallel to the axis of the sight openings 13, 13', but normal to the path of the light rays coming from the lamp 14 to the prism 17. As clearly shown in Figure 3, the prism 17 is disposed wholly within the housing 27 for the auxiliary carrier 30 so as to be substantially completely enclosed thereby. However, the opening 29 in the back of the housing 27 is sufficiently large to permit the light rays emerging from the upper end of the prism 17 to pass through this opening 29 so that the light may be directed into the eye of the subject.

The auxiliary carrier 30 is provided with a plurality of openings 33 extending through the continuous wall thereof in equally spaced relation to each other, as clearly shown in Figure 8, these openings being preferably arranged in the lower half of the auxiliary carrier as will be understood from reference to Figure 4. Mounted in the respective openings 33 is a series of light modifying units which may have various controlling effects on the light rays. For example, one of these units 34 may comprise a large aperture, another unit 35 may comprise a small aperture, another unit 36 may comprise a slit, another unit 37 may comprise a color filter, and another unit 38 may comprise a light diffusing instrumentality. The number of these units 34 to 38 inclusive may be varied according to the requirements of the user, and the foregoing description has been given simply by way of example. Other units may be added, such as polaroid lenses, graticules, etc., if desired, and whatever the arrangement may be it will be understood that the rotary adjustment of the auxiliary carrier 30 will cause the light modifying instrumentalities to be selectively moved into and out of the path of the light rays at a point between the lamp 14 and the prism 17, preferably just above the upper end of the ferrule 15 which extends about the lamp. The bottom of the casing 27 has an opening 27' therein to permit the light from the lamp to pass into the casing.

By reason of the position of the operating member 32 for the auxiliary carrier 30 at the upper end of the ophthalmoscope head, it is readily accessible for convenient control by the user's hand, and the operation of the auxiliary carrier 30 will be easy and smooth as a result of the closely machined working fit between the auxiliary carrier and the housing 27 in which it is mounted. Moreover, the prism 17 and the light modifying units 34 to 38 are given the maximum protection against accidental damage and the collection of dirt and dust which would otherwise interfere with the smoothness of operation of the auxiliary carrier and the accurate modification of the light rays. In these respects, the rotary form of the auxiliary carrier 30 is a material improvement over the slides heretofore used for somewhat the same purposes. Due to the annular construction of the rotary carrier 30, there is more room afforded interiorly of the same to allow for adjustment of the lenses of certain of the units 34 to 38 to obtain the best focus and light intensity of the light rays.

In order to facilitate selective registration of the lenses 12 in the main lens carrier 9 with the sight openings 13, 13', and similarly to facilitate selective positioning of the light modifying units 34 to 38 in the path of the light rays, there is preferably provided a simple and improved detent means generally designated 39 which is common to both the main lens carrier 9 and auxiliary carrier 30. The construction of the detent means 39 is best illustrated in Figure 7, wherein the same takes the form of a disk 40 composed of some suitable resilient material such as spring bronze or brass. The disk 40 is provided with a central opening 41 of such size as to permit the same to be mounted upon the boss 8 on the frame plate 7, with the disk disposed between the main rotary lens carrier 9 and the frame plate 7. If preferred, the face of the frame plate 7 may be recessed so that the disk 40 will lie flush within the face of the frame plate when it is mounted on the boss 8 as above described.

Extending radially outwardly from the disk 40 is an arm 42 having its free extremity offset at 43 towards the back of the main rotary carrier 9. Between each pair of light openings 24, 24 in the main lens carrier 9, the material of the lens carrier is cut away to form a short, radially disposed groove 44, there being one of these grooves to correspond with each lens 12 in the carrier 9. The offset end 43 of the arm 42 on the disk 40 is adapted to selectively engage the grooves 44 to yieldably restrain the main lens carrier 9 against inadvertent rotation, this engagement taking place as each lens 12 is selectively brought into register with the sight openings 13, 13'. To allow for yielding movement of the detent arm 42 and its carrier engaging end 43, during movement of the grooves 44 into and out of engagement with the detent means, the frame plate 7 is slotted or grooved at 45 in back of the arm 42 as is best shown in Figure 5.

Coacting with the auxiliary carrier 30 is a second detent arm 46, which is preferably struck out from the disk 40, and provided with an offset 47 extending towards the opposite side of the disk 40 from that side towards which the offset 43 extends at the free end of the arm 42. The detent arm 46 lies opposite the elongated slot 22 in the portion of the frame plate 7 which is disposed in front of the lamp 14, and the free end of the detent arm 46 projects rearwardly through this slot 22 so that its offset end 47 may be selectively engaged with a series of notches 48 formed in the inner edge of the auxiliary carrier 30. As each of the light modifying units 34 to 38 is selectively moved into the path of the light rays, a corresponding notch 48 is yieldably engaged by the offset end 47 of the detent arm 46, facilitating accurate positioning of the light modifying units, and preventing inadvertent displacement of the same after they have been positioned.

It will be understood from the foregoing that the use of the auxiliary carrier 30 necessitates only minor modifications of conventional ophthalmoscope head construction, which is of course of great advantage from a manufacturing standpoint. In addition, the mounting of the auxiliary carrier 30 is accomplished by the use of relatively few additional parts, all of which are simple to make and relatively inexpensive, so that the additional cost of incorporating the auxiliary carrier in the ophthalmoscope head is negligible, or at least reduced to a minimum.

It will be understood from the foregoing that the expression "light modifying means" as used herein and in the claims, is to be interpreted in its broad sense, that is, to embrace apertures of various sizes and shapes, lenses, filters, graticules, and the like.

While the specific details have been herein shown and described, the invention is not confined thereto as changes and alterations may be made without departing from the spirit thereof as defined by the appended claims.

What we claim as new and desire to secure by Letters Patent is:

1. In an ophthalmoscope, a frame having a sight opening therein to permit observation of the subject therethrough, a rotary lens carrier mounted on the frame and carrying a plurality of lenses for selective registration with the sight opening, an illuminating system carried by the frame at one side of the lens carrier for directing a beam of light onto the subject in the line of vision through the sight opening and a selected lens registered therewith, said last named means including a source of light and light reflecting means spaced from the source of light and carried by the frame adjacent to the sight opening, an annular member rotatably mounted on the frame and encompassing the light reflecting means aforesaid with one side only of the annular member interposed between the source of light and the light reflecting means, and means carried by said annular member and selectively movable into the path of the light rays between the source of light and the light reflecting means for modifying the light rays entirely at a point at the side of the rotatable annular member which is disposed between the light source and the reflecting means aforesaid.

2. In an ophthalmoscope, a frame having a sight opening therein to permit observation of the subject therethrough, a rotary lens carrier disc mounted on the frame and carrying a plurality of lenses for selective registration with the sight opening, an illuminating system carried by the frame at one side of the lens carrier for directing a beam of light parallel to the plane of the lens carrier disc and thence substantially perpendicular to the lens carrier disc onto the subject in the line of vision through the sight opening and a selected lens registered with the sight opening, and means mounted on the frame for selective modification of the light beam, said last named means comprising a continuous annular member rotatably adjustable about an axis normal to the path of that part of the light beam which is parallel to the lens carrier disc, said annular member having a portion at one side only thereof disposed in the latter path of the light beam and carrying a plurality of light modifying means selectively movable therewith into and out of the path of the last mentioned light beam incident to rotation of the annular member, and operating means extending radially outwardly from the annular member adjacent to the end of the frame to enable rotative movement to be imparted to the annular member.

3. In an ophthalmoscope, a frame having a sight opening therein to permit observation of the subject therethrough, a rotary lens carrier disc mounted on one side of the frame and carrying a plurality of lenses for selective registration with the sight opening, an illuminating system carried by the opposite side of the frame for projecting a beam of light onto the subject in the line of vision through the sight opening and a selected lens registered therewith, said last-named means including a source of light and light reflecting means spaced from the source of light and carried by the frame adjacent to the sight opening, a circular cup-shaped casing attached to the frame at the side of the latter on which the illuminating system is carried and enclosing the light reflecting means, said casing having an opening in the outer face thereof aligned with the sight opening in the frame, and having a second opening in the peripheral wall thereof disposed in the path of the light beam between the light source and the light reflecting means to permit admittance of the light beam through the latter opening into the casing, and projection of the light beam by the light reflecting means outwardly of the casing through the first-mentioned opening in the outer wall of the casing, an annular member rotatably mounted within the casing and having bearing engagement with the peripheral wall thereof, with one side of the annular member disposed between the light source and the light reflecting means, and means carried by the latter side of the annular member and selectively registrable with the corresponding light admitting opening in the peripheral wall of the casing, for modifying the light beam.

4. Apparatus as defined in claim 3, wherein the peripheral wall of the casing is provided with an elongated slot, and the rotatable annular member carrying the light modifying means is provided with an operating member fixed thereto and projecting through the elongated slot aforesaid so as to be accessible for imparting rotative adjustment to the annular member in selectively registering the light modifying means with the light admitting opening in the peripheral wall of the casing.

5. Apparatus as defined in claim 3, in combination with detent means mounted on the frame and coacting with the rotatable lens carrier disc and the rotatable annular member carrying the light modifying means, for yieldably holding the lens carrier disc and annular member in their selective positions of rotative adjustment.

6. Apparatus as defined in claim 3, in combination with detent means common to the rotatable lens carrier disc and the rotatable annular member carrying the light modifying means, for yieldably holding said lens carrier disc and annular member in their respective selective positions of rotative adjustment.

7. Apparatus as defined in claim 3, in combination with detent means common to the rotatable lens carrier disc and the rotatable annular member carrying the light modifying means, for yieldably holding said lens carrier disc and annular member in their respective selective positions of rotative adjustment, said detent means having the form of a disc mounted on the frame coaxially respecting the rotary lens carrier disc, and said detent disc being provided with a pair of resilient arms respectively engaging the lens carrier disc and annular member.

8. Apparatus as defined in claim 3, in combination with detent means common to the rotatable lens carrier disc and the rotatable annular member carrying the light modifying means, for yieldably holding said lens carrier disc and annular member in their respective selective positions of rotative adjustment, said detent means having the form of a disc mounted on the frame coaxially respecting the rotary lens carrier disc, and said detent disc being provided with a pair of resilient arms respectively engaging the lens carrier disc and annular member, one of said resilient arms projecting radially outwardly from the margin of the detent disc, and the other of said arms being struck out of the body of the detent disc and projecting radially inwardly from the margin of the detent disc.

9. Apparatus as defined in claim 3, in combination with detent means common to the rotatable lens carrier disc and the rotatable annular member carrying the light modifying means, for yieldably holding said lens carrier disc and annular member in their respective selective positions of rotative adjustment, said detent means having the form of a disc mounted on the frame coaxially respecting the rotary lens carrier disc, and said detent disc being provided with a pair of resilient arms respectively engaging the lens carrier disc and annular member at the opposite sides of the frame, said frame having an opening therein to permit engagement of one of the detent arms with one of the lens carrier discs and annular member which is at the side of the frame opposite to the detent disc.

WILLIAM N. ALLYN.
WILLIAM G. ALLYN.